United States Patent Office 3,042,663
Patented July 3, 1962

3,042,663
HYPONITRITE CATALYSTS FOR POLYMERISATION OF ETHYLENICALLY UNSATURATED COMPOUNDS
Gerald Scott, Manchester, England, assignor to Imperial Chemical Industries Limited, Millbank, London, England, a corporation of Great Britain
No Drawing. Filed July 28, 1958, Ser. No. 751,152
Claims priority, application Great Britain Aug. 7, 1957
5 Claims. (Cl. 260—88.7)

This invention relates to the polymerisation of ethylenically unsaturated compounds and more particularly to the use of certain organic hyponitrites as catalysts.

In application Serial No. 655,491, filed in the names of John Woolley Batty, Arthur Lambert, Gerald Scott, Frank Babbington and Leslie Seed on April 29, 1957, and now abandoned for their application Serial No. 688,416, filed October 7, 1957, and issued as U.S. Patent 2,971,952, there is described a process for the polymerisation of ethylenically unsaturated compounds characterised in that as catalyst there is used at least one organic hyponitrite wherein the organic residue contains at least one ether oxygen atom, preferably on an alpha carbon atom.

It has now been found that especially valuable catalysts are those wherein the organic residue contains one ether oxygen atom on the alpha carbon atom and said alpha carbon atom is attached otherwise only to carbon atoms.

Thus according to the present invention there is provided the improvement in or modification of the invention of application Serial No. 655,491 which comprises using as catalyst at least one organic hyponitrite wherein both the organic residues contain one ether oxygen atom on the alpha carbon atoms and said alpha carbon atoms are attached otherwise only to carbon atoms.

The organic hyponitrites to be used as catalysts in the process of the present invention have the formula

ROCR'R"ON=NOCR'R"OR wherein R, R' and R" stand for organic radicals, the same or different and R and R' or R' and R" may be linked together so as to form, with the alpha carbon atom, a ring. More particularly, R may be alkyl, cycloalkyl, aralkyl, aryl or heterocyclic. R' and R" may be alkyl, aryl, aralkyl, cycloalkyl, heterocyclic or may together and with the alpha carbon atom be cycloalkyl, heterocyclic, saturated or unsaturated and may carry further substitutents such as cyano, carboxylic ester, halogen, alkyl, preferably on the alpha carbon atom. Of these we prefer the organic hyponitrites in which R' and R" together with the alpha carbon atoms form cycloalkyl rings as the hyponitrites are then polymerisation catalysts effective at particularly low temperatures.

The manufacture of the organic hyponitrites may be performed in the general manner described in application Serial No. 655,941 (e.g. by reaction of silver hyponitrite or other metal hyponitrite and the appropriate halide, preferably in solution in any solvent which is compatible with the polymerization process, e.g. ethers, usually using a temperature of —20° C. to 10° C., preferably below —10° C. except that due to their lower stability the compounds must be prepared and stored at an appropriately lower temperature than those described in that application and the general properties of the hyponitrites are also similar.

In particular, however, the new hyponitrites are more efficient catalysts than those described in that application.

Thus, for example, bis-1-methoxy cyclobutyl hyponitrite catalyses the polymerisation of vinyl acetate as rapidly at 0° C. as methoxymethyl hyponitrite catalyses the polymerisation thereof at 35° C.

Other specific examples of the new hyponitrite catalysts are bis(1-methoxy-1-methylethyl), bis(1-ethoxy-1-methylethyl), bis(1-nonyloxy-1-methylethyl), bis(1-methoxy-cyclopropyl), bis(1-methoxycyclobutyl) bis(1-methoxycyclopentyl), bis(2-methyltetrahydrofurfuryl), bis(1-methoxy-1-methyisobutyl), bis(1-methoxy - 1 - methylneopentyl), bis(1-methoxy-2:2:4:4-tetramethylcyclobutyl), bis-(1-methoxy-2-carbomethoxycyclobutyl), bis(1-methoxy-2:5-dimethylcyclopentyl), bis(1-methoxy - 1 - cyclohexylethyl), bis(1-methoxy-1-methyl-2-carbethoxyethyl) hyponitrites.

The invention is illustrated but not limited by the following examples in which parts and percentages are by weight.

*Examples 1, 2 and 3*

0.1 part of bis(1-methoxy-cyclopentyl) hyponitrite in 2 parts of toluene is added to 100 parts of the following vinyl compounds; vinyl acetate, acrylonitrile, methylmethacrylate. The temperature of the vinyl compound during this addition was the polymerisation temperature shown in the table below. The extent of polymerisation in a given time is tabulated below:

| Example | Monomer  | Temperature, °C. | Time (Mins.) | Polymer (Parts) |
|---|---|---|---|---|
| 1 | Vinyl acetate | 20 | 30 | 87 |
| 2 | Acrylonitrile | 20 | 20 | 85 |
| 3 | Methylmethacrylate | 20 | 120 | 45 |

*Examples 4 and 5*

0.13 part of bis(1-methoxycyclobutyl) hyponitrite in 4 parts of dimethylformamide is added at 0° C. to 100 parts of the following vinyl compounds; vinyl acetate, acrylonitrile. The extent of polymerisation in a given time is as follows:

| Example | Monomer | Temperature, °C. | Time (Mins.) | Polymer (Parts) |
|---|---|---|---|---|
| 4 | Vinyl acetate | 0 | 20 | 73 |
| 5 | Acrylonitrile | 0 | 20 | 35 |

*Example 6*

7.1 parts of 1-chloro-1-ethoxycyclohexane (B.P. 47.5 at 48.5° C./4 mm.) is stirred with 5.5 parts of silver hyponitrite in 25 parts of dry ether at —20° C. for 24 hours. The reaction mixture is filtered. The residue is washed with two portions of ether (4 parts) and the combined filtrates are evaporated at 0° C. The involatile product contains 3.2% Cl and 6.5% N; 0.2 ml. of the product when dissolved in decane and heated to 100° C. yields 7.7 ml. of gas (measured at room temperature and pressure), constituents of the gas include $H_2$ 0.1%, $CH_4$ 5.2%, $CO_2$ 7.5%, $N_2O$ 11.5%, $N_2$ 65%, all by volume.

0.1 ml. of the reaction product is placed in a small stirred autoclave which is closed and purged of air by repeated charging with ethylene to a few atmospheres pressure and releasing to atmosphere. The vessel is then charged with ethylene and heated at 80° C. and 1000 atmospheres pressure for 6 hours. At the end of this time the pressure is released and the vessel is found to contain 0.8 gm. of a solid polymer of ethylene.

*Examples 7–12*

The use, according to the method of Examples 1 to 3, in polymerisation of vinyl acetate of a number of esters is recorded in the following table. The temperature of polymerisation was 40° C. in each case and the time taken to reach 75% conversion to polymer is quoted.

| Example | Bis-hyponitrite | Time (mins.) |
|---|---|---|
| 7 | 1-methoxy cyclohexyl | 50 |
| 8 | 1-methoxy-1-methylethyl | 110 |
| 9 | 1-methoxy-1-methylpropyl | 65 |
| 10 | 1-methoxy-1-ethylpropyl | 40 |
| 11 | 1-methoxy-1:2-dimethylpropyl | 22 |
| 12 | 1-ethoxy-1-isopropyl-2-methylpropyl | 10 |

I claim:

1. A process for the polymerization of a compound containing the group $>C=CH_2$ which comprises polymerizing said compound in the presence of a catalytic amount of a catalyst selected from the group consisting of bis(1-methoxy-cyclopentyl)hyponitrite; bis(1-methoxy-cyclobutyl)hyponitrite; bis(1-ethoxy-cyclohexyl)hyponitrite; and bis(1-methoxy-cyclohexyl)hyponitrite.

2. A process according to claim 1 in which the ethylenically unsaturated compound is vinyl acetate.

3. A process according to claim 1 in which the ethylenically unsaturated compound is acrylonitrile.

4. A process according to claim 1 in which the ethylenically unsaturated compound is methyl methacrylate.

5. A process according to claim 1 in which the ethylenically unsaturated compound is ethylene.

References Cited in the file of this patent
UNITED STATES PATENTS

| | | |
|---|---|---|
| 2,398,926 | Dorough | Apr. 23, 1946 |
| 2,683,140 | Howard | July 6, 1954 |
| 2,758,107 | Heiligmann et al. | Aug. 7, 1956 |
| 2,913,481 | Batty et al. | Nov. 17, 1959 |
| 2,971,952 | Batty et al. | Feb. 14, 1961 |

OTHER REFERENCES

Hackh's Chemical Dictionary, 3rd edition, page 428.